United States Patent
Bahlmann et al.

(10) Patent No.: US 10,102,618 B2
(45) Date of Patent: Oct. 16, 2018

(54) SYSTEM FOR DETECTING THE STATE OF A CURRENT COLLECTOR

(71) Applicant: SIEMENS AKTIENGESELLSCHAFT, Munich (DE)

(72) Inventors: Claus Bahlmann, Berlin (DE); Frank Gerstenberg, Berlin (DE); Christian Klier, Potsdam (DE); Frank Voss, Berlin (DE)

(73) Assignee: Siemens Aktiengesellschaft, Munchen (DE)

( * ) Notice: Subject to any disclaimer, the term of this patent is extended or adjusted under 35 U.S.C. 154(b) by 217 days.

(21) Appl. No.: 14/905,383

(22) PCT Filed: Jul. 15, 2014

(86) PCT No.: PCT/EP2014/065100
§ 371 (c)(1),
(2) Date: Jan. 15, 2016

(87) PCT Pub. No.: WO2015/007718
PCT Pub. Date: Jan. 22, 2015

(65) Prior Publication Data
US 2016/0180518 A1    Jun. 23, 2016

(30) Foreign Application Priority Data
Jul. 17, 2013   (DE) ..................... 10 2013 214 022

(51) Int. Cl.
*H04N 7/18*    (2006.01)
*G06T 7/00*    (2017.01)
(Continued)

(52) U.S. Cl.
CPC .............. *G06T 7/0008* (2013.01); *B60L 3/12* (2013.01); *B60L 5/205* (2013.01); *G06K 9/2063* (2013.01);
(Continued)

(58) Field of Classification Search
CPC ......... B60L 5/205; B60L 3/12; G06K 9/2063; H04N 7/183; H04N 5/77; G06T 7/0008
See application file for complete search history.

(56) References Cited

U.S. PATENT DOCUMENTS 7,430,922 B2    10/2008 Herrmann et al.
9,061,594 B2    6/2015 Wesche et al.
(Continued)

FOREIGN PATENT DOCUMENTS

CN    101784887 A    7/2010
DE    102004001799 A1    7/2005
(Continued)

OTHER PUBLICATIONS

Li Xiaodong et al.: "Digital image processing using MATLAB" (latest edition), p. 344, Tsinghua University Press, ISBN 978-7-302-29108-4, 2012—Statement of Relevance.

*Primary Examiner* — Neil R Mikeska
(74) *Attorney, Agent, or Firm* — Laurence Greenberg; Werner Stemer; Ralph Locher (57) ABSTRACT

A system for detecting a state of a current collector of an electrically driven vehicle includes a video camera device for digitally recording images of the current collector and an image-evaluating device for the data evaluation of the image recordings. The current collector has optically detectable markings, the position and/or shape and/or surface area and/or color of which can be detected by the image-evalu-
(Continued)

ating device in an automated manner. A system that makes the automatic state detection faster and more reliable is thereby provided.

5 Claims, 5 Drawing Sheets

(51) Int. Cl.
    *B60L 5/20*     (2006.01)
    *B60L 3/12*     (2006.01)
    *G06K 9/20*     (2006.01)
    *H04N 5/77*     (2006.01)

(52) U.S. Cl.
    CPC ............... *H04N 5/77* (2013.01); *H04N 7/183* (2013.01); *G06T 2207/30204* (2013.01); *G06T 2207/30268* (2013.01)

(56) References Cited

U.S. PATENT DOCUMENTS 9,214,016 B2 * 12/2015 Sacchi .................. G06T 7/0004

2007/0272506 A1 * 11/2007 Herrmann ................. B60L 5/20
                                                                                                    191/55
2007/0296949 A1     12/2007 Blair
2010/0322465 A1     12/2010 Wesche et al.
2012/0013743 A1 *  1/2012 Tanarro Marquez ..... B60L 5/26
                                                                                                    348/148

FOREIGN PATENT DOCUMENTS

| DE | 102005042087 B3 | 3/2007 |
|---|---|---|
| DE | 102009006392 A1 | 7/2010 |
| JP | H 05146001 A | 6/1993 |
| JP | 2004312832 A | 11/2004 |
| JP | 2005337714 A | 12/2005 |
| JP | 2008104312 A | 5/2008 |
| JP | 2009244023 A | 10/2009 |
| JP | 2009294033 A | 12/2009 |
| JP | 2010190886 A | 9/2010 |
| KR | 20110062733 A | 6/2011 |
| RU | 113498 U1 | 2/2012 |
| WO | 2009018612 A1 | 2/2009 |

* cited by examiner

SYSTEM FOR DETECTING THE STATE OF A CURRENT COLLECTOR

BACKGROUND OF THE INVENTION

Field of the Invention

The invention relates to a system for detecting a state of a current collector of an electrically driven vehicle including a video camera device for digitally recording images of the current collector and an image evaluating device for the data evaluation of the image recordings, wherein the current collector has optically detectable markings the position and/or shape and/or surface area and/or color of which can be detected by the image evaluating device in an automated manner.

Electrically driven vehicles are equipped with a current collector for the purpose of transferring electrical energy between an overhead line system and an electric drive of the vehicle. Such vehicles are known in the form of rail-borne vehicles such as electric trainsets or electric locomotives, for example, and in the form of non-rail-bound vehicles such as electric buses for short-distance public passenger transport or diesel-electric utility vehicles in opencast mining operations, for example. Current collectors have articulated frames in the form of rods, single-arm pantographs or double-arm pantographs, which can be adjusted by means of a lifting device between a lowered resting position and a raised operating position. In the operating position, an electrical rubbing contact is established between a trolley shoe of the current collector and an overhead contact wire of an overhead line system. Overhead line systems for rail-borne vehicles are normally unipolar, and therefore have only one overhead contact wire configured as a forward conductor, the grounded rails of the track being used as a return conductor. Non-rail-bound vehicles have current collectors with two reciprocally insulated trolley shoes which contact two contact wires of a bipolar overhead line system, these being configured as forward and return conductors. While the contact makers are arranged in guided pole shoes in the case of rod collectors, they are configured as elongated collector strips in the case of bow collectors, said collector strips being held in a yoke which is supported by the frame, and being aligned parallel to a transverse axis of the vehicle.

Since collector strips are subject to operational wear due to the friction with an overhead contact wire, they must be replaced at regular intervals. As a result of their essential importance for the energy supply of the vehicle, current collectors undergo visual inspection by maintenance personnel in order to check the state of the current collector. The state of the collector strips is determined by the degree of wear of the rubbing surface over the whole working width of the collector strip, by possible defects such as chips or fractures, and by the position and alignment of the collector strip on the yoke. However, the state of the current collector is also determined by the position and alignment of the yoke on the frame or of the frame itself, which may deviate from their original shape due to deformations and consequently lead to malfunctions.

The unexamined German application DE 10 2004 001 799 A1 discloses a sensor device for signaling the wear state at the rubbing bodies of a current collector, wherein said sensor device consists of blind holes which are introduced into the rubbing body, and a monitoring unit, these being interconnected via transmission channels. The blind holes contain a medium which generates signals when a specific wear state occurs, and the transmission channels contain a medium which transmits these signals to the monitoring unit. The medium which generates and transmits the signal may be compressed air, an electrical conductor or an optical conductor.

The patent specification DE 10 2005 042 087 B3 discloses a method for detecting the state of a current collector which has two peripheral regions and one central position in a longitudinal direction, each of these being equipped with a strain measuring point. Mechanical strains of the current collector, these being caused by the contact force between the current line and the current collector, are detected at the strain measuring points. The present wear of a rubbing element of the current collector is ascertained from the present contact force, this being determined from the strains in the peripheral regions, and the strain which is detected at the central position. The strain measuring points may take the form of fiber Bragg grating sensors.

The unexamined German application DE 10 2009 006 392 A1 shows an arrangement for monitoring the operational state and wear state of rubbing contact devices of electrically driven rail-bound vehicles. The rubbing contact devices are each arranged on a pantograph device which can be lowered and raised. A power supply network has a current line which is arranged above the vehicle and is suspended from a multiplicity of power masts which are arranged at intervals. An image capture system is arranged on at least one power mast or on the current line for the purpose of automatically capturing images of the rubbing contact device of a vehicle traveling past. The image capture system has a plurality of electronic cameras, each of which is aligned at a different viewing angle relative to the rubbing contact device. The image recordings are transmitted to a computer as a coherent image data record for the purpose of image processing and/or evaluation. A human operator then evaluates the recorded images of the rubbing contact device visually on a monitor, possibly with the aid or support of a program application using software-based image recognition.

The quality of the recorded video images is often not good enough to allow reliable detection of the state in an automated manner. The video images must instead be inspected by experienced maintenance personnel, making it both time-intensive and costly to detect the state of a current collector.

BRIEF SUMMARY OF THE INVENTION

The object of the invention is therefore to provide a system of the type in question, by means of which the present state of a current collector can be detected more quickly and reliably in an automated manner.

The object is achieved by a system for detecting a state of a current collector of the type cited in the introduction, having the following features. Taking as its starting point a video camera device for digitally recording images of the current collector and an image evaluating device for the data evaluation of the image recordings, the current collector of an electrically driven vehicle according to the invention has optically detectable markings whose position and/or shape and/or surface area and/or color can be detected by the image evaluating device in an automated manner. The essence of the invention is to provide the current collector being examined with markings, whose changes due to wear or deformations can be identified quickly and reliably on a recorded video image of the current collector. As a result of limiting the image evaluation to the markings, it is possible in an outline first step to determine image regions of interest containing the markings, and then in a detailed second step to evaluate only the image data relating to the image regions of interest, in order to determine the precise features of the markings, such as position, shape, surface area or color. This saves a considerable amount of computing time during the image evaluation. Moreover, it simplifies the evaluation such that the state of the current collector can be detected more reliably.

In an advantageous embodiment variant of the system according to the invention, the collector strip has a marking which extends in the direction of wear and whose position and/or shape and/or surface area and/or color changes with increasing wear. It is possible thus to provide markings which penetrate through the collector strip or are externally applied thereto in a contrasting color or in successive layers of contrasting colors, and which are abraded by the wear and change their geometric shape or their surface area or their exposed color surface in this way.

The collector strip of a system according to the invention preferably has a continuous marking or a plurality of separate markings across its working width. By virtue of the separation of the markings, it is easily possible to define the spatial accuracy of the wear state detection over the working width.

In an advantageous embodiment of the system according to the invention, the collector strip has a marking outside its working width as a reference. By this means, the marking which is exposed to the wear can be directly compared on the video image with the comparison markings outside the working region of the collector strip.

In an advantageous embodiment of the system according to the invention, the current collector has a plurality of markings which are arranged in a distributed manner and have a defined reciprocal location in an operational state of the current collector. Position markings here include both applied color markings and shaped components which allow the marked position on the current collector to be determined quickly on the video image. The image evaluation is effected here by comparing a recorded actual relative location with a reference relative location which is stored in the image evaluating device and corresponds to a model operating state of the current collector. Discrepancies may indicate a deformation or warping of components of the current collector.

In a preferred embodiment variant of the system according to the invention, a contrast panel is attached to the current collector, forming a high-contrast background marking for at least part of the current collector in the viewing direction of a video camera. By this means, in addition to any chipping of collector strip parts, which can be identified from a changed profile of the collector strip on the video image, fractures in the body of the collector strip can also be detected more effectively.

BRIEF DESCRIPTION OF THE SEVERAL VIEWS OF THE DRAWING

Further properties and advantages of the invention may be derived from the following description of exemplary embodiments with reference to the drawings, in which FIG. 1 schematically shows a first exemplary embodiment of a marking on a collector strip, FIG. 2 schematically shows a second exemplary embodiment of a marking on a collector strip, FIG. 3 schematically shows a third exemplary embodiment of a marking on a collector strip, FIG. 4 schematically shows a fourth exemplary embodiment of markings on collector strips and a yoke, FIG. 5 schematically shows a fifth exemplary embodiment of markings on collector strips, FIG. 6 schematically shows a sixth exemplary embodiment of markings on a current collector, and FIG. 7 schematically shows a seventh exemplary embodiment of of an inventive system for detecting a state, using perspective illustrations.

DESCRIPTION OF THE INVENTION

Figure 6:
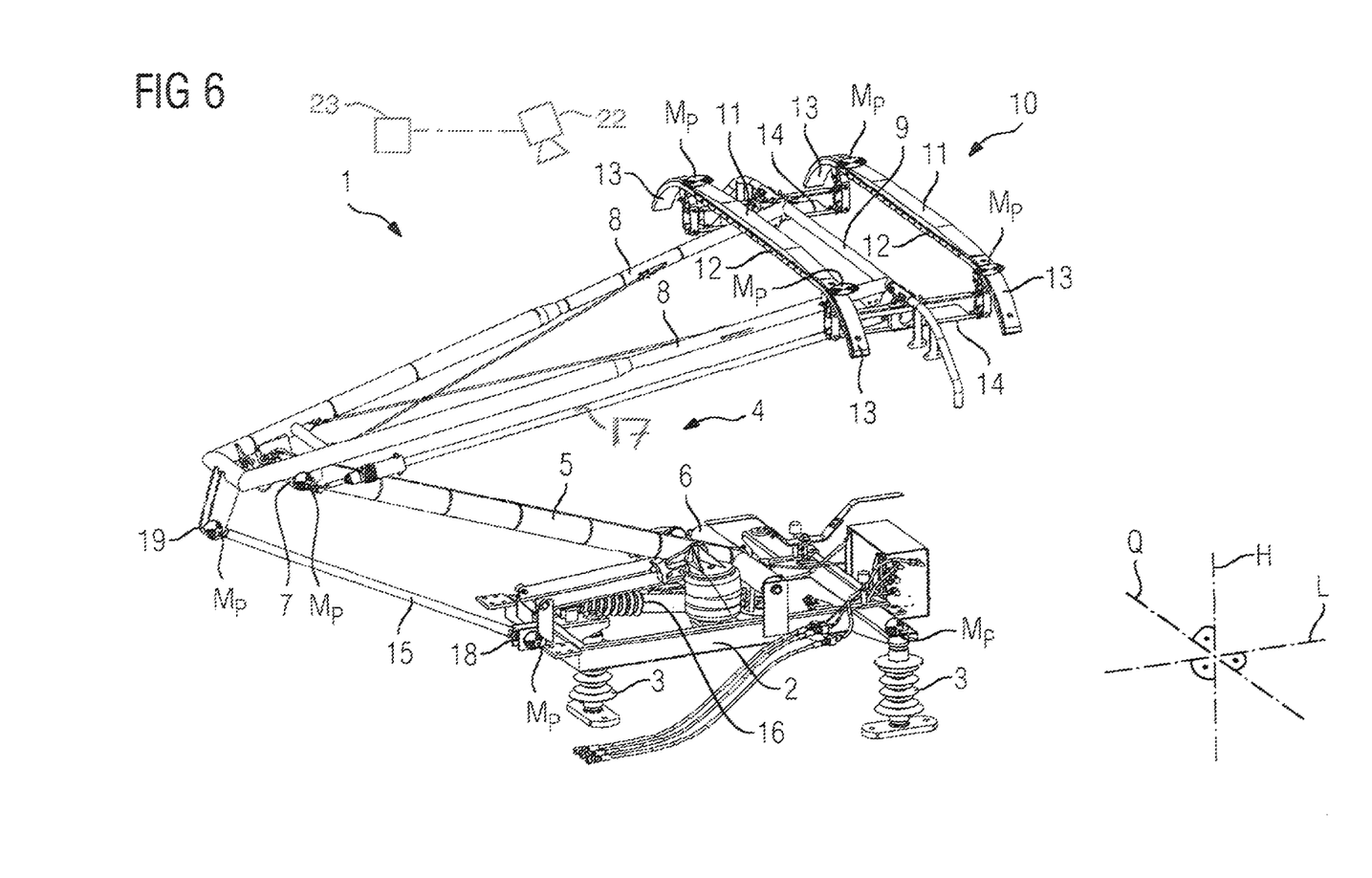

An inventive system for detecting the state of a current collector 1, which is illustrated in its entirety in FIG. 6, comprises a video camera device 22 for digitally recording images of the current collector 1 on a moving vehicle. The video camera device may have one or more video cameras arranged at a detection point on a route, wherein said video cameras can record the current collector 1 from various recording directions. The video cameras may be installed on a bracket of an overhead line system for electrification of a route such as a railroad track or a motorway. The image recordings are sent to an image evaluating device 23 which may be arranged at the detection point or in an evaluation center for the purpose of data evaluation. The image evaluating device has means for processing electronic image data, including computing and storage means with executable programs for image processing. For improved image evaluation in relation to the state of the current collector, the current collector 1 has markings M whose position and/or shape and/or surface area and/or color on the recorded video images can be reliably detected by the image evaluating device in an automated manner.

Figure 1:
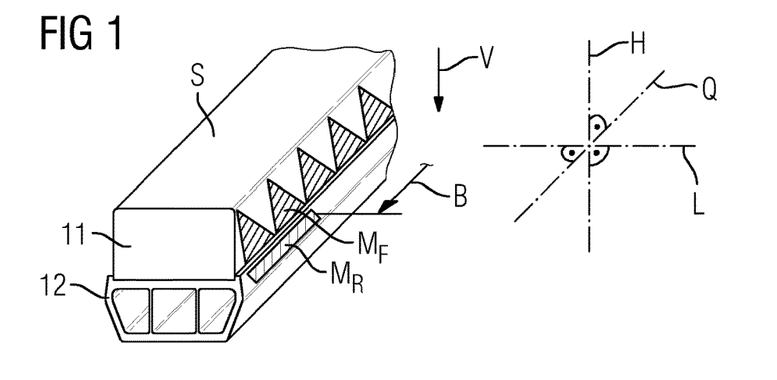
Figure 2:
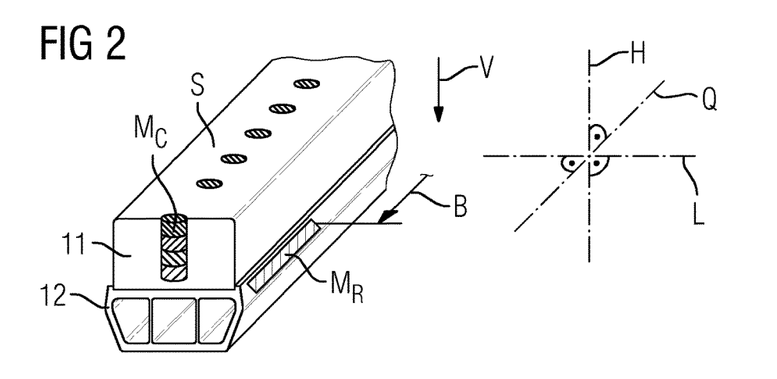
Figure 3:
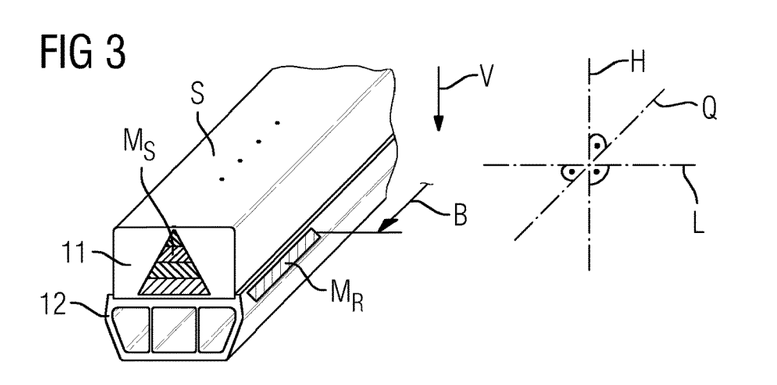

According to FIG. 1 to FIG. 3, a collector strip 11 of the current collector 1 is fixed to a collector strip holder 12 which takes the form of a hollow section. The collector strip 11 has an elongated shape, which extends parallel to a transverse axis of the vehicle Q, and an essentially rectangular cross section. The collector strip 11 may consist of carbon or copper and rubs against an overhead contact wire of the overhead line system (not shown) with its upwards facing rubbing surface S during operation. In the context of an interplay between the course of the contact wire relative to the track layout, possible directional deviations of the vehicle, and throwing movements of the current collector in a transverse direction relative to the longitudinal axis of the vehicle L, it is endeavored to keep the rubbing contact with the overhead contact wire within a certain working width B, which does not utilize the full width of the collector strip 11. During operation, the collector strip 11 is abraded across the working width B, such that the rubbing surface S is lowered more or less evenly in a direction of wear V which runs parallel to a vertical axis of the vehicle H.

Figure 4:
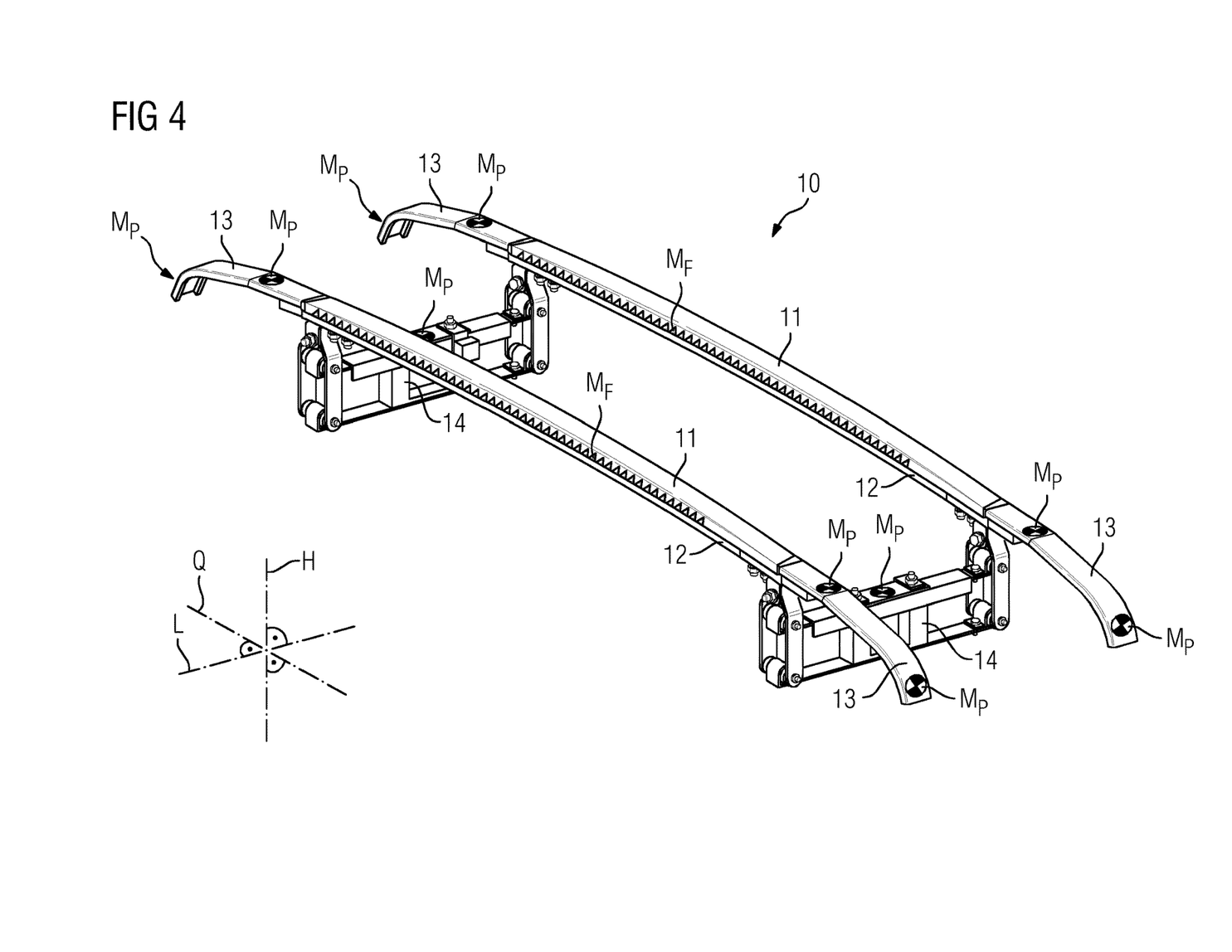

According to FIG. 1 and FIG. 4, shaped markings $M_F$ in a contrasting color, e.g. a red color on a carbon collector strip, are applied to opposing longitudinal sides of the collector strip 11, said markings consisting of a row of triangular surfaces. The triangular surfaces border the collector strip holder 12 on their base sides and taper in an upward direction to their peaks, these being opposite to their base sides, on the edge of the longitudinal sides of the rubbing surface S. The peaks of the triangular surfaces are abraded as the wear increases, such that the shaped markings $M_F$ assume the shape of a trapezium or quadrilateral. The shapes and dimensions of the recorded shaped markings $M_F$ can be determined easily and reliably by image processing means, such that the remaining wear or the sustained wear at this location of the collector strip 11 can be deduced from the respective height of a color marking $M_F$. It is particularly easy to detect the wear if a comparison with unworn shaped markings $M_F$ outside the working width B is possible on the recorded video images. This peripheral region of the collector strip 11 is therefore identified by reference markings $M_R$ in the form of a stripe on the collector strip holder 12.

According to FIG. 2, the collector strip 11 is penetrated by a row of color markings $M_C$ in the form of columns across its width, wherein said markings extend in the direction of wear V and are composed in each case of a stack of segments of different colors. The color markings $M_C$ then appear on the rubbing surface S in a color which corresponds to the respective wear, and which can be identified easily and reliably from recorded video images in each case. The fine detail of the color markings $M_C$ can then be predetermined via the respective heights of the individual color segments.

According to FIG. 3, the collector strip 11 is penetrated by a surface area marking $M_S$. The surface area marking $M_S$ has a triangular cross section, and is developed as a color inclusion which extends continuously or sectionally over the width of the collector strip 11. The triangular cross section borders the collector strip holder 12 on its base side and tapers in an upward direction to its peak, this being opposite to its base side, at the rubbing surface S. As wear increases, the surface area marking $M_S$ becomes visible at the rubbing surface as a continuous or interrupted stripe of increasing surface area, and can therefore be identified by the image evaluation. The wear-dependent widening of the stripe is predetermined by the peak angle of the triangular cross section of the surface area marking $M_S$. In order to allow the wear to be identified more effectively on the video images, the surface area marking $M_S$ may be combined with a color marking $M_C$ in the form of colored layers as per FIG. 2.

The course of the wear can be reliably identified over the working width B of the collector strip 11 in all of the embodiments of optically detectable markings M as per FIG. 1 to FIG. 3, wherein said embodiments may also be combined with each other.

According to FIG. 4, a yoke 10 of the current collector 1 has two collector strips 11 which run parallel to each other and to the transverse axis of the vehicle Q, and which are arranged one behind the other relative to the longitudinal axis of the vehicle L. The collector strip holders 12 have downwards curving terminating horns 13 at their lateral ends, aiding the lateral mounting of a contact wire onto the collector strips 11, and are connected together and to a crossbar 9 of the current collector 1 via two parallelogram guides 14. Position markings $M_P$ are applied to the yoke 10 at predetermined positions, their location relative to each other being defined according to the design. A position marking $M_P$ may take the form of a circular symbol with circle segments of different colors, such that the position to be marked is defined by a center of a circle and is identified easily and reliably on recorded video images. Position markings $M_P$ are arranged e.g. at the outer ends of the terminating horns 13 and at the transition to the collector strip holders 12. In the context of image evaluation, on the basis of a comparison between the detected actual relative location of the position markings $M_P$ and a stored reference relative location, it is now possible to deduce whether each of the collector strips 11 and/or collector strip holders 12 and terminating horns 13 have deformations such as distortions or warping, for example. Position markings $M_P$ may also be applied to a central location on the parallelogram guides 14. This means that it is also possible to measure the actual position and actual location of the collector strips 11 relative to each other and within the yoke 10 by image processing means, and to compare these with reference positions and reference locations. Discrepancies indicate deformations or damage of these components.

Figure 5:
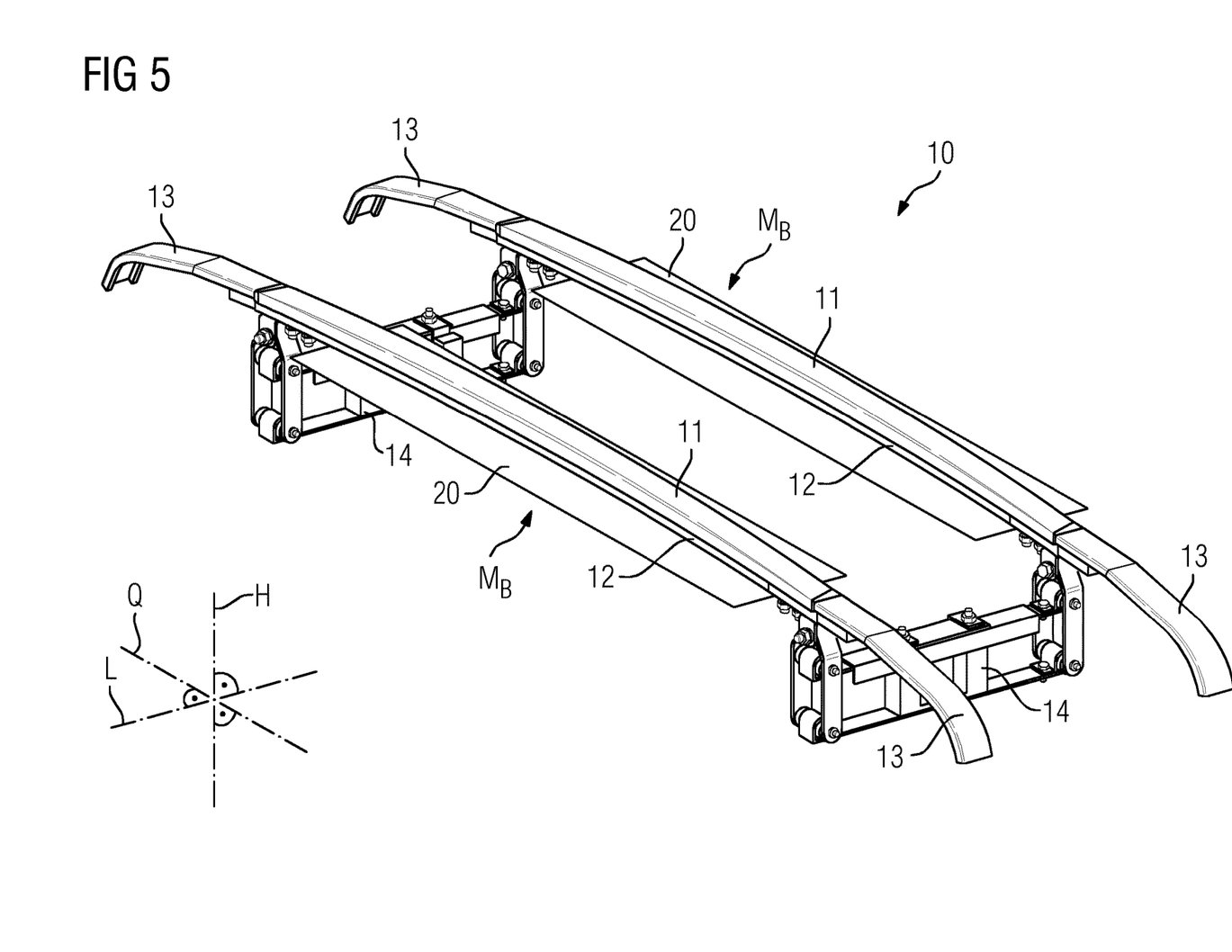

According to FIG. 5, flat contrast panels 20 are arranged on the underside of the collector strip holder 12 and provided with a color scheme which contrasts starkly with the material of the collector strips 11. By means of suitable arrangement and alignment relative to the recording direction of a video camera, the contrast panels 20 form background markings $M_B$ which make it possible in the context of image evaluation to identify the silhouettes and the body of the collector strips 11 on the video recordings more effectively, in order to detect chips or even fractures in the collector strips 11 in an automated manner.

According to FIG. 6, a current collector 1 has a base frame 2 which is supported on a vehicle (not shown) via electric insulators 3. The current collector 1 has an articulated frame 4 comprising a lower arm 5 which is connected to the base frame via a lower joint 6, and an upper arm 8 that is connected to the lower arm 5 via an upper joint 7. The upper arm 8 has two bars which diverge in the form of a V, starting from the upper joint 7, and whose ends are connected by a crossbar 9 which runs parallel to the transverse axis of the vehicle Q. The crossbar 9 forms the swivel joint of the yoke 10, about which the two parallelogram guides 14 bearing the collector strips 11 are rotatably mounted. A lifting device 16 is arranged on the base frame 2 and activates an operating rod 15 which is connected via a joint 18 on the frame. The operating rod 15 is connected to the upper arm 8 via a joint 19 on the frame. By means of activating the lifting device 16, the double-arm pantograph frame 4 can move the yoke 10 between a lower resting position and an upper operating position, in which the collector strips 11 are pressed against the overhead contact wire (not shown) in order to establish a rubbing contact. In order to ensure that the collector strips 11 remain at the same height when the yoke 10 is being raised or lowered, one of the parallelogram guides 14 and the lower arm 5 are coupled by a guide rod 17. In addition to the position markings $M_P$ on the yoke 10 as described above, position markings $M_P$ are also applied to the joints 7, 18 and 19 and to the base frame. As a result of their positive guidance, the position markings $M_P$ on the joints 7 and 19 and the position markings $M_P$ on the yoke 10 can only move on defined trajectories which have a fixed relative location in relation to the fixed position markings $M_P$ on the base frame 2 and on the joint 18. Any deviation of the position markings $M_P$ from their predetermined trajectories, as detected by means of image evaluation, indicates deformations in the frame 4 or the yoke 10 and may indicate a limitation or lack of operational suitability of the current collector 1.

Figure 7:
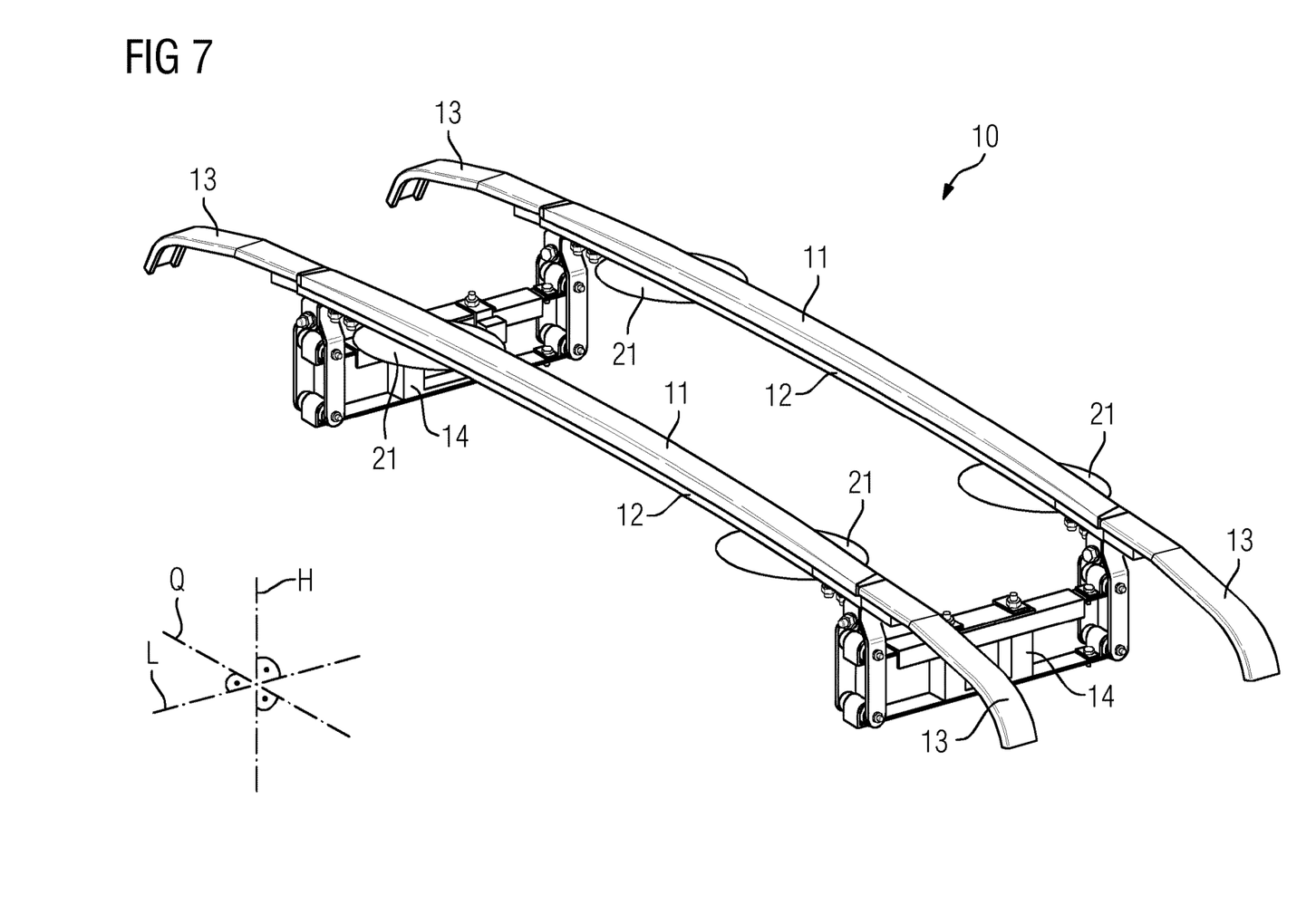

According to FIG. 7, position markings $M_P$ may also take the form of shaped components 21 which are attached at defined positions of the yoke 10 of a current collector 1 and have a component shape outline which can be detected more easily by image evaluation. In the exemplary embodiment shown here, mounted on each of the collector strip holders 12 in the end region of the collector strips 11 are circular shaped components 21 whose centers identify a defined position and whose surfaces identify a defined plane. In an operational state of the current collector 1, the four shaped components 21 may define the same plane. Deformations such as distortions or warping of the components of the yoke 10 can be deduced by detecting the reciprocal actual location of these position markings $M_P$ and the elliptical actual shapes resulting from the recording direction of the video camera in respect of the outlines of the shaped components 21.

The invention claimed is:

1. A system for detecting a state of a current collector of an electrically driven vehicle, the system comprising:
   a video camera device for digitally recording images of the current collector;
   an image evaluating device for data evaluation of the image recordings; and
   optically detectable markings extending inside the current collector, said optically detectable markings having at least one of a position or shape or surface area or color to be detected by said image evaluating device in an automated manner;
   said optically detectable markings including a marking disposed at a collector strip of the current collector and extending in a direction of wear of the collector strip, said marking having at least one of a position or shape or surface area or color changing with increasing wear.

2. The system according to claim 1, wherein said optically detectable markings include a continuous marking or a plurality of separate markings disposed across a working width of the collector strip.

3. The system according to claim 2, wherein said optically detectable markings include a marking disposed at the collector strip outside of the working width as a reference.

4. The system according to claim 1, wherein said optically detectable markings include a plurality of markings disposed at the current collector in a distributed manner and having a defined reciprocal location in an operational state of the current collector.

5. The system according to claim 1, which further comprises a contrast panel attached to the current collector and forming a high-contrast background marking for at least part of the current collector in a viewing direction of said video camera device.

* * * * *